Nov. 23, 1954 W. P. SCHMITTER 2,694,939
MULTISPEED TRANSMISSION
Filed Sept. 30, 1949 4 Sheets-Sheet 1
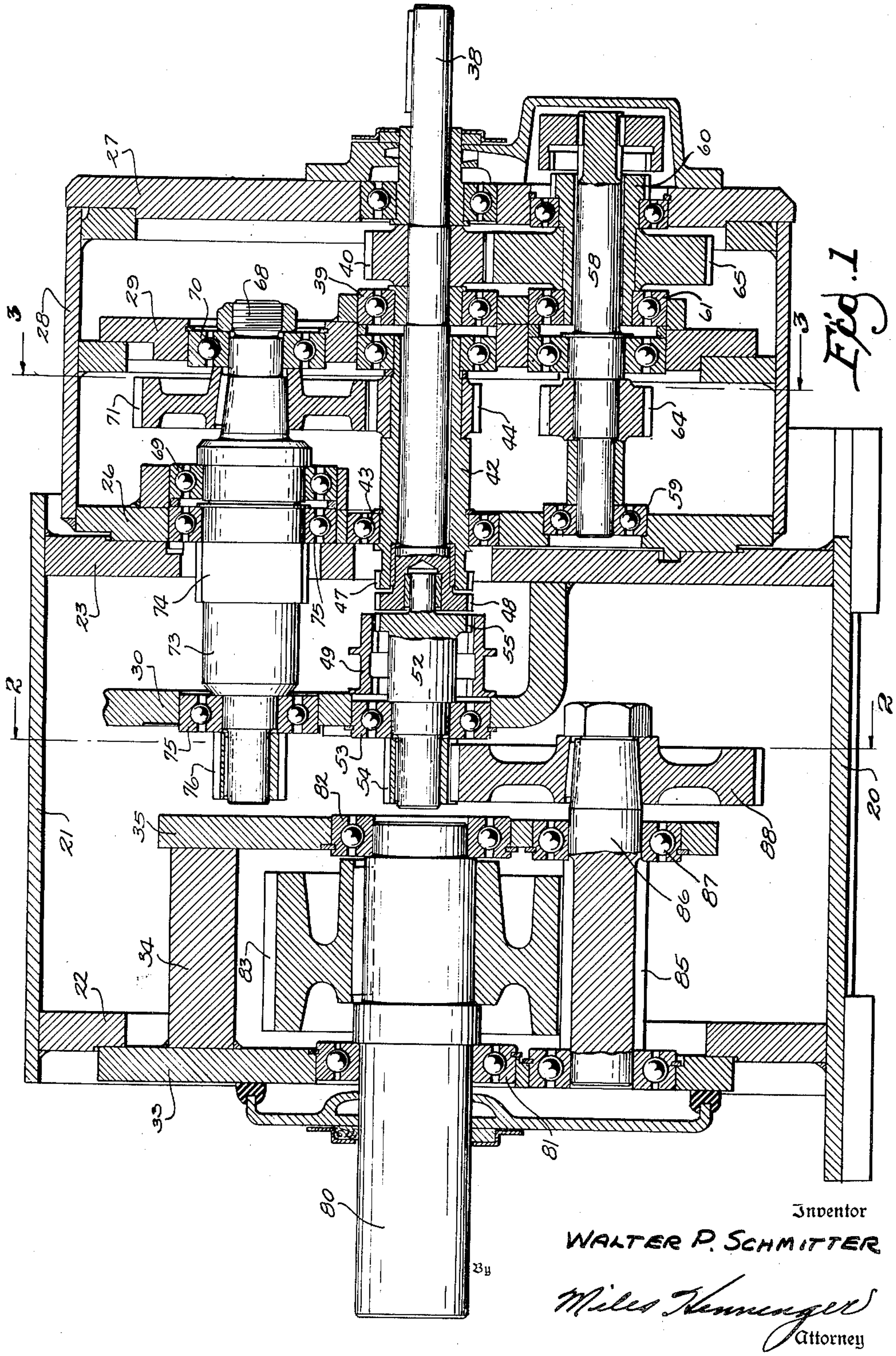
Inventor
WALTER P. SCHMITTER
By Miles Henninger
Attorney Nov. 23, 1954 W. P. SCHMITTER 2,694,939

MULTISPEED TRANSMISSION

Filed Sept. 30, 1949 4 Sheets-Sheet 1

Inventor

WALTER P. SCHMITTER

By Miles Henninger

Attorney

Nov. 23, 1954 W. P. SCHMITTER 2,694,939

MULTISPEED TRANSMISSION

Filed Sept. 30, 1949 4 Sheets-Sheet 3

Inventor

WALTER P. SCHMITTER

Miles Henninger

Attorney

MULTISPEED TRANSMISSION

Filed Sept. 30, 1949

Inventor
WALTER P. SCHMITTER

By
Miles Henninger
Attorney

United States Patent Office 2,694,939

Patented Nov. 23, 1954

2,694,939

MULTISPEED TRANSMISSION

Walter P. Schmitter, Milwaukee, Wis., assignor to The Falk Corporation, Milwaukee, Wis., a corporation of Wisconsin Application September 30, 1949, Serial No. 118,775

21 Claims. (Cl. 74—359)

This invention relates to improvements in multi-speed power transmissions and particularly to transmissions of the type in which the gears are always in mesh.

In prior constant-meshed gear transmissions for obtaining a multiplicity of speeds, the various gear combinations are usually produced by engaging and disengaging friction clutches. However, such clutches are subject to slippage under some conditions and, particularly where material quantities of power are to be transmitted, require considerable maintenance work. Further, such transmissions were not heretofore designed to permit the use of any considerable number of standard parts nor could such parts be combined in various relationships to secure a series of transmissions for obtaining different numbers of speeds, nor were the transmissions so designed that at least some of the sub-assemblies were identical in the various transmissions of the series.

It is, therefore, an object of the present invention to provide multiple speed transmissions of the constant-meshed gear type in which only positively engageable and disengageable clutches are employed.

Another object of the invention is to provide a series of multi-speed constant-meshing gear power transmissions in which a major portion of the parts of such transmissions are standard for the series of transmissions and in which at least some of the sub-assemblies in such series of transmissions, are identical for all of the transmissions in the series.

And a further object of the invention is to provide a multi-speed power transmission of relatively simple and cheap construction and of relatively small size, in which the parts are rugged and of proven reliability and require only minimum maintenance, and which may be readily manufactured for transmitting any desired quantity of power.

Objects and advantages other than those above set forth will be apparent from the following description when read in connection with the accompanying drawing in which:

Figs. 2 and 3 are diagrams showing the relationship in space of some of the shafts and gears, and which relationship is not shown in Fig. 1.

Figs. 4 to 7, inclusive, are diagrams showing the flow of power from the lowest speed shown in Fig. 4 to the highest speed shown in Fig. 7, of the four-speed transmission.

Figures 8, 9, 10:
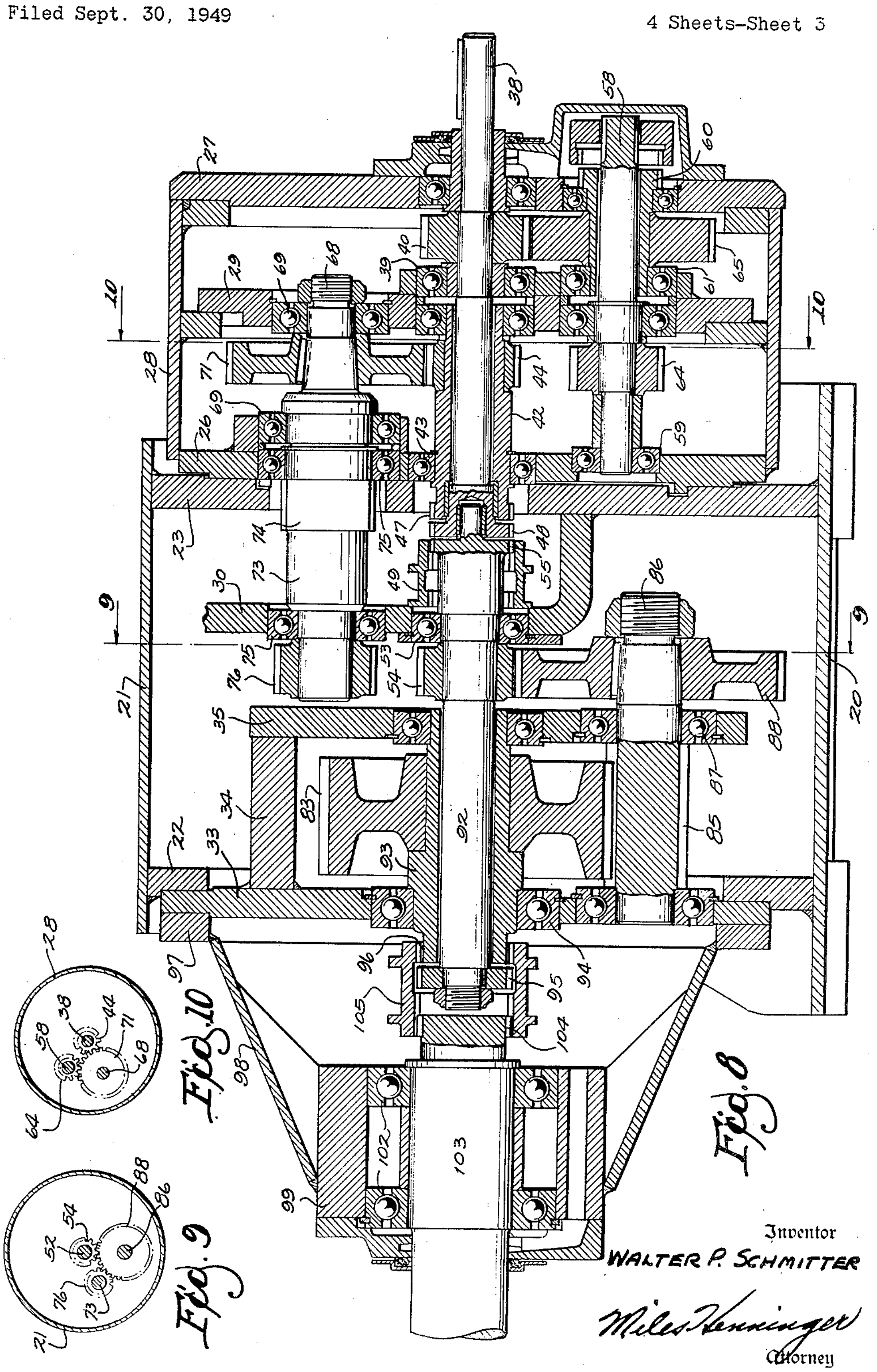

Fig. 8 is a longitudinal cross-sectional view on a plane through the axis of an eight-speed transmission embodying the present invention.

Figs. 9 and 10 are diagrams illustrating the spatial relationship of some of the shafts and gears, and which relationship is not apparent in Fig. 8.

Figure 1:
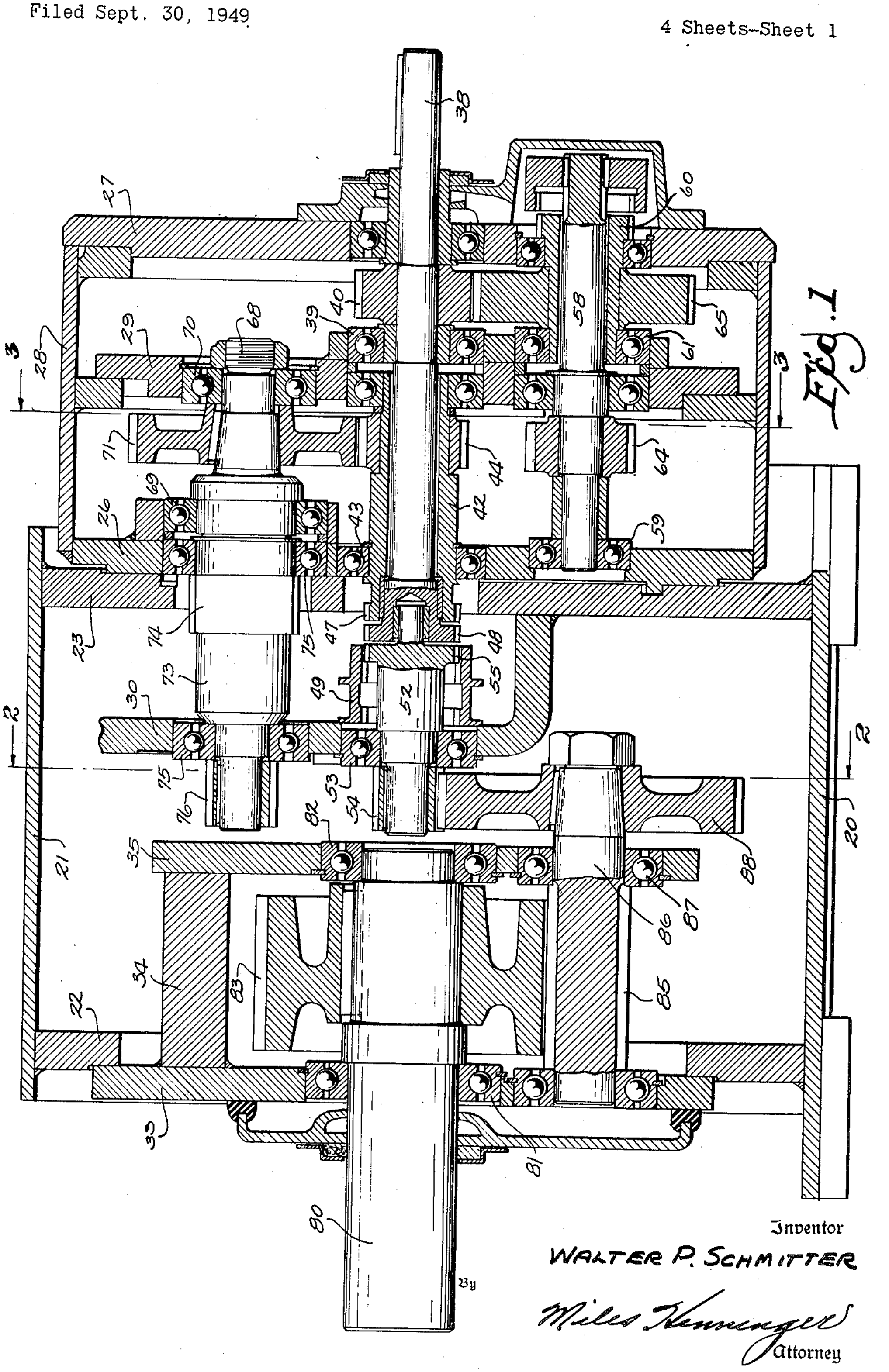
Fig. 1 is a longitudinal cross-sectional view on a plane through the axis of a four-speed transmission embodying the present invention.
Figure 11:
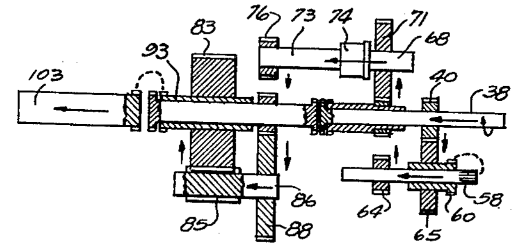
Figure 12:
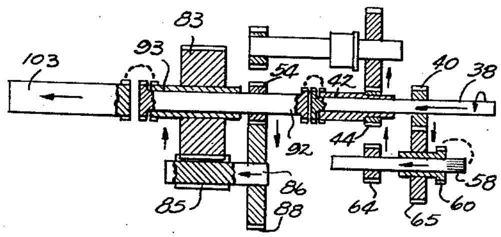
Figure 13:
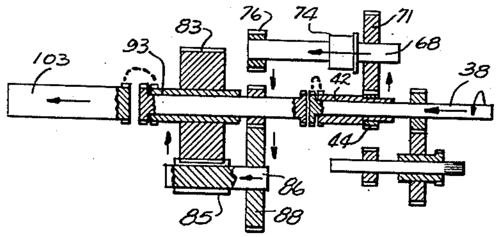
Figure 14:
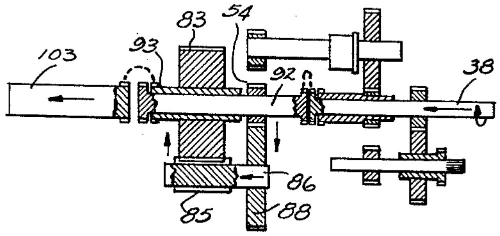
Figure 15:
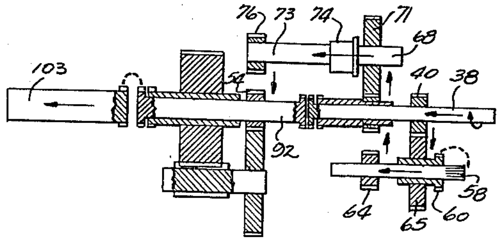
Figure 16:
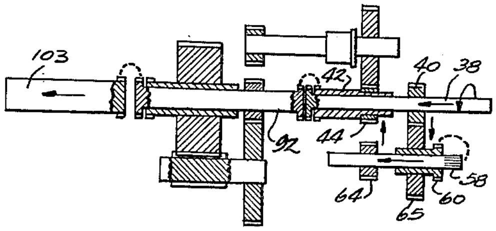
Figure 17:
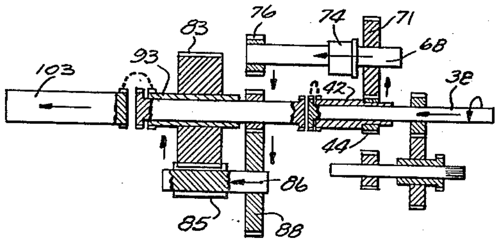
Figure 18:
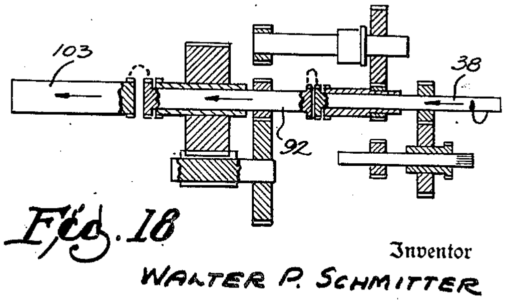

Figs. 11 to 18, inclusive, are diagrams showing the flow of power from the lowest speed shown in Fig. 11 and increasing progressively to the highest speed shown in Fig. 18, for the eight-speed transmission, and Fig. 19 is a fragment of Fig. 1, partially in section, of one form of over-running clutch which may be used in the present invention.

Generally, the present structure includes main and auxiliary casings and one or two casing extensions dependent on the number of output speeds to be obtained. The main casing includes bracket-like structures extending toward one another internally of the main casing and coacting wtih other main casing parts in supporting the moving transmission parts in the main casing. The casing extension is required only to furnish support for a single shaft in the higher speed embodiment of the invention. All of the casings are fabricated by joining plates so that a minimum of machining operations are required and such operations are simple and quickly performed due to the simple forms of the individual plates. All of the shafts are parallel so that the apertures for the various bearings in the various casing end and intermediate plates and brackets are also relatively simple to align.

One bracket in the main casing supports an output gear train, the one output gear train shaft being axial of the casing and the other shaft being vertically below such axis. The other bracket in the main casing substantially supports intermediate gears selectively engageable for independent operation of the output gear train by either of such gears, one shaft for such gears being on the axis of the main casing while the other shaft is below and to one side of such axis. The auxiliary casing supports the input shaft axially of such casing and also supports two counter-shafts above and below, respectively, the axis of such casing to provide a number of gear trains in such casing. Some of the gears in the input gear trains are mounted directly on the shafts of the input sub-assembly, while others of such gears are mounted on sleeves surrounding the shafts.

In the four-speed transmission, the final output gear is mounted directly on the final shaft for the output gear train which is also the output shaft. In the eight-speed transmission, the final output gear is on a sleeve about the output train shaft to permit direct connection of the output gear train with a separate output shaft or to permit delivery of power to the output shaft by a path of power flow which does not include the output gear train.

One jaw clutch in the auxiliary sub-assembly or unit controls flow of power from the input shaft to the input gear trains from which power flows via an over-running type clutch to one of the intermediate gears. A second jaw clutch controls connection of either the input shaft or a one of the input gear trains (in conjunction with the over-running clutch) to the other intermediate gear.

All of the input gear trains and of the intermediate gears and their associated clutches, are identical in both modifications. Most of the output gear train is also identical in both modifications, the differences being only in the shaft supporting one of the gears, addition of a separate output or power delivery shaft and means for supporting such shaft, and addition of a clutch.

Referring particularly to Figs. 1 and 8, a base plate 20 of substantially rectangular shape has fixed thereto an arcuate side wall member 21 into which are fitted an end ring 22 to form a partial end wall for a main casing and an end plate 23 closing one end of such casing. On the end wall 23 of the main casing is mounted an auxiliary casing comprising circular plates 26 and 27 joined by a cylindrical side wall member 28 and with a plate 29 located intermediate the end plates of the auxiliary casing for aiding such end plates in supporting the moving parts at the input end of a multi-speed transmission. Support of the intermediate parts of the transmission is provided by a bracket 30 fixed on and extending in spaced parallel relation with the main casing end plate 23.

The support for the whole of the moving output parts of the transmission shown in Figs. 1 to 7, inclusive, and for supporting a portion of the moving output parts of the transmission shown in Figs. 8 to 18, inclusive, is provided by a plate 33 mounted on the main casing end ring 22, such plate having spacers 34 extending therefrom for supporting a plate 35 within the main casing in spaced parallel relation with plate 33. All of the above parts are common to both modifications of the invention and are of the same shape and size so that a number of transmissions can be built up from a minimum stock of parts.

Power is supplied to the transmission by way of an input shaft 38 mounted in bearings 39 in the auxiliary casing plates 27 and 29 and such shaft carries a gear 40. A portion of the shaft 38 is enclosed in a sleeve 42 supported in bearings 43 in the auxiliary casing plates 26 and 29 and such sleeve has fixed thereon a gear 44. One end of the sleeve 42 extends beyond the bearings 43 and is formed with teeth 47, and the end of shaft 38 adjacent such teeth 47 is also formed with teeth 48 and is provided with a socket receiving a bearing bushing. The teeth 47, 48 together with an internally toothed sleeve 49 form a portion of a first dental coupling.

The socketed end of the shaft 38 forms a steady bearing for one end of a shaft 52, the remainder of such shaft 52 being supported in bearings 53 in the bracket 30 and having a gear 54 fixed thereon. The shaft 52 is toothed as at 55 adjacent the teeth 47 and 48, respectively, in the sleeve 42 and the shaft 38 and all of such teeth coact with the coupling sleeve 49 in forming the first dental coupling or clutch by which any two sets of teeth 47, 48 and 55 may be engaged. It will be understood that the coupling sleeve 49 is operable by any one of the usual operating means and that such operating means are omitted for the sake of clarity in the drawings.

A lower counter-shaft 58 is mounted in bearings 59 in the auxiliary casing plates 26, 29 and is partially enclosed by a sleeve 60 supported in bearings 61 in the auxiliary casing plates 27, 29. Sleeve 60 is formed with teeth engageable with a clutch member 63 splined on shaft 58 for movement to engage with the teeth of the sleeve. The shaft 58 has mounted thereon a gear 64 while the sleeve 60 has mounted thereon a gear 65 which meshes with input gear 40. An upper counter-shaft 68 is mounted in bearings 69, 70 in the auxiliary casing plates 26, 29 and supports a gear 71. The several counter-shafts are in parallel spatial relationship with the input shaft 38 but the various gears thereon are in mesh as may be seen by reference both to Figs. 1 and 2 of the drawings. Thus gears 40, 65 are always in mesh and gears 44 and 64 are always in mesh with the gear 71, but are not in mesh with one another.

The shaft 68 is joined with another shaft 73 by a clutch 74 which is of the over-running type such as shown in Fig. 19 or as shown in an application for U. S. Letters Patent by Walter P. Schmitter, Serial No. 148,936, Figs. 3 and 6 particularly. Such shaft and clutch are supported in bearings 75 in the main casing end plate 26 and in bracket 30. A gear 76 is mounted on shaft 73 for meshing with the gears of the output train of the transmission, the gears 54 and 76 being similar and herein called intermediate gears.

The output end or unit of the transmission, in the embodiment shown in Figs. 1 to 8, inclusive, comprises an output shaft 80 supported in bearings 81 in bracket plate 23 and bearings 82 in bracket plate 35 and such shaft has a gear 83 fixed thereto. The gear 83 meshes with a gear 85 on a counter-shaft 86 supported in bearings 87 in plates 33, 35 and such shaft also has fixed thereto a gear 88. The above structure is herein collectively called the output gear train. It will be seen by reference to Fig. 3 of the drawings that gears 54 and 76 are always in mesh with gear 88 but do not mesh with one another.

It will be seen that the drive shaft 38 and the counter-shaft 58 are connected through gears 40 and 65, of different size, to secure rotation of these shafts at different speeds, so that connection of the one or the other of the shafts through their respective gears 44 and 64 to the gear 71, forms a speed reduction gear train which may be driven at either one of two speeds.

It will further be seen that gears 44 and 71 are alternatively connectable, respectively, to the shafts 38 and 58 through the clutches 47, 48, 49 or the clutch 63 and that shafts 38 and 69 are also alternatively connectable to the gear 88 through the clutch 48, 49, 55 and the clutch 74. Hence, gears 54 and 76 may be interposed between the shafts 38 and 68 and the gear 88 to effect operation of the gear 88 in any one of three speeds, one of such speeds being the input speed while the other two speeds differ from the input speed and from each other.

The gear 71 is connectable by way of the one-way or over-running clutch 74 so that the gear 76 may drive the gear 88 only when counter-shaft 68 is rotating in a given direction.

The novel combination of parts described above provides a multi-speed transmission of very compact form which is readily attachable to and detachable from the power input end of the main speed reducer unit housing 23 to secure operation of the speed reducing gearing 83, 85 and 88 at any one of four different speeds.

Referring now to the power flow diagrams illustrating the four speeds obtainable from the first embodiment of the invention (see Figs. 1–7 inclusive), the power flow paths for such speeds are individually shown in Figs. 4 to 7, inclusive, the lowest speed being shown in Fig. 4 and the speeds increasing progressively in Figs. 5 and 6 to the highest speed shown in Fig. 7. The curved arrows about the shaft 38 indicate the direction of rotation of the driving means while the straight arrows applied to the diagram show the path of power flow in the several diagrams. The input shaft 38 and the entire output gear train including gears 83, 85, shaft 86 and gear 88 and the output shaft 80, are part of each of the power flow paths and are not therefore included in the following table:

*Table I.—Four-speed transmission*

| Speed | Gears | Sleeve | Gears | Shaft | Gears | Sleeve | Shaft | Clutch | Shaft | Gears |
|---|---|---|---|---|---|---|---|---|---|---|
| 1-------- | 40, 65 | 60 | -------- | 58 | 64, 71 | -------- | 68 | 74 | 73 | 76, 88 |
| 2-------- | -------- | 42 | 44, 71 | 68 | -------- | -------- | -------- | 74 | 73 | 76, 88 |
| 3-------- | -------- | -------- | -------- | 52 | 54, 88 | -------- | -------- | -------- | -------- | -------- |
| 4-------- | 40, 65 | 60 | -------- | 58 | 64, 71, 44 | 42 | 52 | -------- | -------- | 54, 88 |

Referring now to Fig. 8, it will be seen that counter-shaft 52 of Fig. 1 is now replaced by a considerably extended shaft 92 on which is mounted a sleeve 93 supported in bearings 94 in the bracket plates 22 and 35. The gear 83 is now fixed on the sleeve 93 rather than on the output shaft 40 as in Fig. 1. A toothed disk 95 is mounted on shaft 92 and the sleeve 93 is toothed as shown at 96 at the end adjacent such disk.

A ring 97 is fixed on the bracket plate 33 and has fixed thereon a frusto-conical shell 98 receiving a cylinder 99, the ring, shell and cylinder forming an extension casing in which are mounted bearings 102 supporting an output or power delivery shaft 103. The output shaft 103 is toothed as shown at 104 to coact with the teeth 95 on the shaft sleeve 93, with disk 94 and with an internally toothed coupling sleeve 105 to form a dental coupling, designed to be operated by any usual means not shown.

It will be seen by reference to Fig. 9 that the gears 44 and 64 are always in mesh with the gear 70 but do not mesh with one another, and by reference to Fig. 10 that the gears 54 and 76 are always in mesh with the gear 88 but not in mesh with one another. Hence, there are no gaps in the input gear train and between intermediate gear 76 and the output gear train as would appear to be the case upon consideration only of Fig. 8 and the diagrams shown in Figs. 11 to 18.

In the structure shown in Figs. 8 through 18 the speed reducer is modified for doubling the number of speeds obtainable from a given input auxiliary train, and requires only a relatively slight modification of the main speed reducer as by the addition of a bearing, a shaft and a coupling.

Thus, the structure of Figs. 1 through 7 is modified by mounting the final gear 83 on a sleeve 93 rotatable about a shaft 92 on which is mounted the gear 54 and which may be connected directly to the drive shaft 38. Either the sleeve 93 or the shaft 92 may be connected by a coupling 95, 96, 104, 105 with an output shaft 103. Even though the above modification requires only the substitution of two parts in the main gear structure, the addition of the output shaft and the output coupling produces a transmission in which eight output speeds may be obtained.

Referring now to the power flow diagrams shown in Figs. 11 to 18, it will be understood that the clutch 74 at some times is a part of the power flow path and at other times is over-running. Curved arrows again show the direction of rotation of the driving means and straight arrows are again applied to those portions of the transmission through which power flows to the output shaft.

The input shaft 38 and the output shaft 103 are part of each power flow path and are not shown in the following table in which all other parts of the transmission are listed in the order in which such parts receive power:

*Table II.—Eight-speed transmission*

| Speed | Gears | Sleeve | Shaft | Gears | Sleeve | Shaft | Shafts and Clutch | Gears | Shaft | Gears | Sleeve |
|---|---|---|---|---|---|---|---|---|---|---|---|
| 1 | 40, 65 | 60 | 58 | 64, 71 | -------- | -------- | 68,73 and 74 | 76, 88 | 86 | 85, 83 | 93 |
| 2 | 40, 65 | 60 | 58 | 64, 71, 44 | 42 | 92 | -------- | 54, 88 | 86 | 85, 83 | 93 |
| 3 | -------- | 42 | -------- | 44, 71 | -------- | -------- | 68, 73 and 74 | 76, 88 | 86 | 85, 83 | 93 |
| 4 | -------- | -------- | 92 | 54, 88 | -------- | -------- | -------- | -------- | 86 | 85, 83 | 93 |
| 5 | 40, 65 | 60 | 58 | 64, 71 | -------- | -------- | 68, 73 and 74 | 76, 88, 54 | 92 | -------- | -------- |
| 6 | 40, 65 | 60 | 58 | 64, 71, 44 | 42 | 92 | -------- | -------- | -------- | -------- | -------- |
| 7 | -------- | 42 | -------- | 44, 71 | -------- | -------- | 68, 73 and 74 | 76, 88 | 86 | 85, 83 | 93 |
| 8 | -------- | -------- | -------- | -------- | -------- | 92 | -------- | -------- | -------- | -------- | -------- |

It will thus be seen that a series of multiple speed transmissions are obtained which comprise identical main and auxiliary casings. The main casings include internal bracket structures of which only one bracket requires slight modifications for use in either the four-speed or the eight-speed transmissions herein described. The subassemblies or units at the power input ends of the transmissions are identical in both modifications of the invention. The intermediate gears are modified for the higher number of speeds only by a substitution for one of the shafts in the modification for the lower number of speeds. The output gear train is modified by the addition of a sleeve for mounting one of the gears, the provision of outboard bearings mounted in an extension casing for supporting the power delivery shaft and the provision of another clutch, to convert the four-speed transmissions to eight-speed transmissions.

Identical jaw clutches and identical over-running clutches are employed in the two present embodiments of the invention. A different number clutch constructions is utilized in the two modifications, the four-speed transmission employing three jaw clutches and the eight-speed transmission employing four such clutches while only one over-running clutch is used in each construction. All of the clutches are identically related to other portions of the structure so that the same clutch control means may be used in both modifications of the invention.

Only a minimum number of different sizes of bearings are used in the several embodiments thus further minimizing the number of individual parts requiring storage and assembly to produce a number of transmissions to cover a large number of different speeds.

Although but two embodiments of the present invention have been illustrated and described, it will be apparent that various changes and modifications may be made therein without departing from the invention as defined in the appended claims.

I claim:

1. An input unit for combination with other units of power transmissions of the multi-speed constantly meshing gear type, the unit comprising a casing having parallel end walls and an intermediate wall, three parallel shafts, two of the shafts extending through the intermediate wall and into the end walls of said casing, pairs of gears severally on two of said shafts, one gear of each said pair being fixed and the other gear of each said pair being rotatable relative to its shaft, a single gear fixed on the third of said shafts and meshing with one of said gears on each of the said two shafts, a clutch for connecting one gear of said pair on one of said shafts with one gear of said pair on another of said shafts, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

2. An input unit for combination with other gearing in multi-speed power transmissions of the constantly meshed gear type, the unit comprising a casing having parallel end walls and an intermediate wall, an input shaft, two counter-shafts parallel with said input shaft, said input shaft and one of said counter-shafts extending through the intermediate wall and into the end walls of said casing, pairs of gears severally on said input shaft and one of said counter-shafts, one gear of each of said pairs being fixed and the other gear of each of said pairs being rotatable relative to its shaft, the fixed gear on said input shaft meshing with the rotatable gear on said one counter-shaft, a single gear fixed on another of said counter-shafts, the said single gear meshing with one gear on said input shaft and one gear on said one counter-shaft, a clutch for connecting one gear on said input shaft with one of the said pair of gears on the said one counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

3. An input unit for multi-speed power transmissions of the constantly meshing gear type, the unit comprising a casing having parallel end walls and intermediate walls, an input shaft axially of said casing, two counter-shafts parallel with said input shaft, said input shaft and one of said counter-shafts extending through the intermediate wall and through one of the end walls of said casing, pairs of gears severally on said input shaft and one of said counter-shafts, one gear of each said pair being fixed and the other gear of each said pair being rotatable relative to its shaft, the fixed gear on said input shaft meshing with the rotatable gear of the pair on said counter-shaft, a single gear fixed on another of said counter-shafts, said single gear meshing with a gear on said one counter-shaft, a clutch for connecting one of said gears on said input shaft with one of said gears on said one counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

4. An input unit for combination with other subassemblies in power transmissions of the multi-speed constantly meshing gear type, the unit comprising an input shaft, two counter-shafts parallel with said input shaft, a pair of gears on each of two of said shafts, a single gear fixed on the third said shaft, sleeves on portions of the said two of said shafts, the one gear of each pair of said gears being severally fixed on said sleeves and the other gear of each pair of said gears being severally fixed on the portions of said shafts, a clutch for connecting one of said pair of gears on said input shaft with one of said pair of gears on said counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

5. An input unit for power transmissions of the multi-speed constantly meshing gear type, the unit comprising an input shaft, two counter-shafts parallel with said input shaft, pairs of gears severally on said input shaft and one of said counter-shafts, a single gear fixed on the other said counter-shaft, sleeves mounted about portions of said input shaft and one of said counter-shafts, one gear of said pair of gears on said input shaft and on one of said counter-shafts being fixed on the several shaft portions and the other gear being mounted on said sleeves about said shafts, a clutch for connecting the said fixed gear on said input shaft with one of said pairs of gears on the said one counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

6. An input unit for combination with other gearing in multi-speed power transmissions of the constantly meshing gear type, the unit comprising an input shaft, a pair of counter-shafts parallel with said input shaft, pairs of gears severally on said input shaft and said one counter-shaft, sleeves severally on a portion of said input shaft and a portion of the said one counter-shaft, the one gear of each said pair being fixed to said shafts and the other gear of each of said pair of gears being mounted on said sleeves about said shafts, the said fixed gear on said input shaft meshing with said rotatable gear on the said one counter-shaft, a single gear fixed on the other said counter-shaft and meshing with said rotatable gear on said input shaft and with said fixed gear on the said one counter-shaft, a clutch slidably mounted on the said one counter-shaft and engageable with said sleeve thereon for connecting the said fixed gear on said input shaft with one of the said pair of gears on the said one counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

7. An input unit for combination in multi-speed power transmissions of the constantly meshing gear type, the unit comprising a casing having parallel end walls and an intermediate wall, sets of aligned bearings in said casing walls, an input shaft, a pair of counter-shafts parallel with said input shaft, pairs of gears on each said input shaft and one of said counter-shafts, a single gear on the other of said counter-shafts, sleeves on a portion of said input shaft and a portion of the said one counter-shaft, said sleeves and said shafts being severally supported in coacting pairs of said bearings, a clutch for connecting one gear on said input shaft with one of the said pair of gears on the one said counter-shaft, a clutch for selective engagement with a second one of said shafts and one of said gears thereon, and a coupling engaged with a third one of said shafts upon rotation thereof in a given direction, selective engagement of said clutches causing delivery of power from one of the said two extending shafts at one of four different speeds.

8. A main sub-assembly for multi-speed power transmissions of the constant meshing gear type, the sub-assembly comprising gearing including a plurality of parallel shafts, a clutch for connecting one of said shafts to a source of power, a coupling for connecting another of said shafts with the source of power for rotation in one direction only and gears severally fixed on said shafts; and output gearing including parallel first and second shafts, a gear on the said first shaft in constant mesh with both the said gears on the plurality of shafts, and gears on the said first and second shafts and in constant mesh for transmitting power from the said first to the said second shaft.

9. A main sub-assembly for multi-speed power transmissions of the constant meshing gear type, the sub-assembly comprising a casing, first and second brackets fixed on the casing walls and extending toward each other within said casing, gearing including a plurality of parallel shafts mounted in and extending through the first said bracket, a clutch for connecting one of said shafts with a source of power, a coupling for connecting another of said shafts with the source of power for rotation in one direction only and gears severally fixed on each of said shafts; and an output gearing including parallel first and second shafts supported in the casing walls and in the said second bracket, a gear mounted on the said first shaft and overhung from the second said bracket for meshing with both of the first said gears, and gears severally fixed on the said first and second shafts between a wall of said casing and the said second bracket and in constant mesh for transmitting power from said first to said second shaft.

10. A main sub-assembly for multi-speed power transmissions of the constant meshing gear type, the sub-assembly comprising a casing, first and second brackets fixed on the casing walls and extending toward each other within said casing, gearing including a plurality of parallel shafts mounted in and extending through the first said bracket, a clutch for connecting one of said shafts with a source of power, a coupling for connecting another of said shafts with the source of power for rotation in one direction only, and gears severally fixed on each of said shafts and overhung from the first said bracket; and output gearing including a first shaft extending through the said second bracket, a second shaft extending from the casing and supported in the casing wall and the second said bracket, a gear on the said first shaft for meshing with both of said gears on the first said shaft, and gears on the said first and second shafts and in constant mesh for transmitting power from the said second shaft to the said first shaft.

11. A main sub-assembly for multi-speed power transmissions of the constant meshing gear type, the sub-assembly comprising a casing, first and second brackets fixed on the casing walls and extending toward each other therefrom, gearing including a plurality of shafts, one of said shafts being mounted in both said brackets and extending through the said second bracket, a clutch connecting one of said shafts with a source of power, a coupling connecting another of said shafts with the source of power for rotation in one direction only, and gears severally fixed on said shafts; and output gearing including a counter-shaft parallel with the said extended shaft, gears on said counter-shaft in constant mesh with the first said gears, a bearing overhung from the casing, a power delivery shaft supported in said bearing, and a clutch connecting said extended shaft and one of said gears on said extended shaft alternately to said power delivery shaft.

12. A main sub-assembly for multi-speed power transmissions of the constant meshing gear type, the sub-assembly comprising a casing, first and second brackets fixed on the casing walls and extending toward each other therefrom, gearing including a plurality of shafts, one of said shafts being mounted in both said brackets and extending through the said second bracket, a clutch connecting one of said shafts with a source of power, a coupling connecting another of the said shafts with the source of power for rotation in one direction only, and gears severally fixed on said shafts; and output gearing including a counter-shaft parallel with said extended shaft, gears mounted on said counter-shaft and in constant mesh with the first said gears, a sleeve on a portion of said extended shaft and a gear on the sleeve and meshing with said one of said gears on said counter-shaft, bearings overhung outwardly from said casing, a power delivery shaft supported in said bearings, and a clutch for connecting said extended shaft and said sleeve alternately with said power delivery shaft.

13. An input unit for combination with other sub-assemblies into power transmissions of the multi-speed constant-meshed gear type, the unit comprising an input shaft, two counter-shafts parallel with the input shaft, a gear fixed on each of the shafts, a gear rotatably mounted on the input shaft, a gear rotatably mounted on one of the counter-shafts, a clutch for connecting the gear fixed on the input shaft with the gear rotatably mounted on one of the counter-shafts, a clutch selectively engageable with the input shaft and with the rotatable gear on the input shaft, and a coupling for releasably connecting the other counter-shaft with one of the said other sub-assemblies, selective engagement of the clutches causing delivery of power from the unit at one of four different speeds.

14. An input unit for combination with other sub-assemblies into power transmissions of the multi-speed constant-meshed gear type, the unit comprising an input shaft, two counter-shafts parallel with the input shaft, a gear fixed on each of the shafts, sleeves severally about portions of two of the shafts and rotatably relative thereto, single gears severally fixed on the sleeves, a manually-operable clutch for connecting the fixed gear on the input shaft with the sleeve about one of the counter-shafts and the gear on the sleeve, a manually-operable clutch for engagement with the input shaft and with the sleeve about the input shaft, and a coupling for automatically releasably connecting the other counter-shaft with one of the said other sub-assemblies dependent on rotation of the counter-shaft in a given direction, selective engagement of the clutches causing delivery of power from the unit at one of four different speeds.

15. In a multi-speed transmission, the combination of a driven rotary element, a drive shaft, a counter-shaft, clutch-controlled gearing for alternatively operating said counter-shaft at either of two speeds, each differing from the speed of said drive shaft, a clutch for alternatively connecting said drive shaft with said driven element and connecting a portion of said gearing with said counter-shaft, and clutches for severally operably connecting said counter-shaft with said driven element and connecting the other portion of said gearing with said drive shaft.

16. In a multi-speed transmission, the combination of a driven rotary element, a drive shaft, a counter-shaft, clutch-controlled gearing for alternatively operating said counter-shaft at either of two speeds each differing from the speed of said drive shaft, a clutch for alternatively connecting said drive shaft with said driven element and with said gearing, a clutch for operably connecting said drive shaft through said gearing with said counter-shaft, and a clutch for operably connecting said counter-shaft with said driven element dependent on rotation of said counter-shaft in a given direction.

17. In a multi-speed transmission, the combination of a driven rotary element, a drive shaft, a counter-shaft, clutch-controlled gearing for alternatively operating said counter-shaft at either of two speeds each differing from the speed of said drive shaft, a clutch for alternatively connecting said drive shaft directly with said driven element or for connecting a portion of said gearing with said counter-shaft, and a plurality of clutches for severally operably connecting said counter-shaft with said driven element and for connecting the other portion of said gearing with said drive shaft, one of said last-named clutches being an over-running clutch.

18. In a multi-speed transmission, the combination of a driven rotary element, a drive shaft, a counter-shaft, clutch-controlled gearing for alternatively operating said counter-shaft at either of two speeds each differing from the speed of said drive shaft, a clutch for alternatively connecting said drive shaft directly with said driven element and with said gearing, a clutch for connecting said drive shaft through said gearing and with said counter-shaft, and a one-way clutch for operably connecting said counter-shaft with said driven element dependent on rotation of said counter-shaft in a given direction.

19. In a multi-speed transmission the combination of a driven rotary element, a drive shaft, a counter-shaft, clutch-controlled gearing alternatively operable to effect operation of one of said shafts at either of two speeds other than that of the other of said shafts, means including an over-running clutch for operably connecting one of said shafts to said driven element, and means including a clutch alternatively operable to connect said driven element to the other of said shafts either through said gearing or independently thereof.

20. In a multi-speed transmission, the combination of a driven rotary element, a drive shaft, a gear to be driven directly by the drive shaft and engageable with the driven element, a counter-shaft, clutch-controlled gearing for alternatively operating the counter-shaft at either of two speeds, each differing from the speed of the drive shaft, a clutch for alternatively connecting the drive shaft with the driven element and connecting a portion of the gearing with the counter-shaft, and clutches for severally operably connecting the counter-shaft with the driven element and for connecting the other portion of the gearing with the drive shaft.

21. A main sub-assembly for multi-speed transmission of the constantly meshed gear type comprising a casing, gearing including a pair of parallel shafts, one of said shafts extending through an end wall of said casing, clutches for severally connecting said shafts with a source of power and gears severally fixed on said shafts, output gearing including a first shaft, gears fixed on the said first shaft, one of the said first shaft gears constantly meshing with one of the first said gears, a sleeve on the said extending shaft and a gear on said sleeve and meshing with one of said gears on said first shaft, a bearing overhung outwardly from said casing, a power delivery shaft supported in said bearing, and a clutch for alternately connecting said extending shaft and said sleeve with said power delivery shaft.

References Cited in the file of this patent

UNITED STATES PATENTS

| Number | Name | Date |
|---|---|---|
| 984,730 | Young | Feb. 21, 1911 |
| 1,589,267 | Toomey | June 15, 1926 |
| 2,257,747 | Jones | Oct. 7, 1941 |
| 2,301,448 | Peterson | Nov. 10, 1942 |
| 2,307,619 | Brewer | Jan. 5, 1943 |
| 2,328,519 | Wahlberg | Aug. 31, 1943 |
| 2,553,376 | Le Tourneau | May 15, 1951 |

FOREIGN PATENTS

| Number | Country | Date |
|---|---|---|
| 512,718 | Great Britain | Sept. 25, 1939 |
| 577,438 | Great Britain | May 17, 1946 |
| 644,483 | Germany | May 5, 1937 |
| 649,521 | Germany | Aug. 26, 1937 |